April 29, 1958  D. A. BUCK  2,832,897
MAGNETICALLY CONTROLLED GATING ELEMENT
Filed July 27, 1955  5 Sheets-Sheet 1

INVENTOR.
DUDLEY A. BUCK
BY Kenway, Jenney, Witter
+ Hildreth
ATTORNEYS

April 29, 1958  D. A. BUCK  2,832,897
MAGNETICALLY CONTROLLED GATING ELEMENT
Filed July 27, 1955  5 Sheets-Sheet 2

*INVENTOR.*
DUDLEY A. BUCK
BY Kenway, Jenney, Witter
 & Hildreth

ATTORNEYS

April 29, 1958  D. A. BUCK  2,832,897
MAGNETICALLY CONTROLLED GATING ELEMENT

Filed July 27, 1955  5 Sheets-Sheet 3

INVENTOR.
DUDLEY A. BUCK
BY Kenway, Jenney, Witter
+ Hildreth,

ATTORNEYS

April 29, 1958

D. A. BUCK 2,832,897

MAGNETICALLY CONTROLLED GATING ELEMENT

Filed July 27, 1955

INVENTOR.
DUDLEY A. BUCK

BY Kenway, Jenney, Witter
 & Hildreth

ATTORNEYS

April 29, 1958     D. A. BUCK     2,832,897
MAGNETICALLY CONTROLLED GATING ELEMENT
Filed July 27, 1955     5 Sheets-Sheet 5

INVENTOR.
DUDLEY A. BUCK

BY *Kenway Jenney*
*Witter & Hildreth*

ATTORNEYS

UNITED STATES PATENT OFFICE 2,832,897
Patented Apr. 29, 1958

2,832,897

MAGNETICALLY CONTROLLED GATING ELEMENT

Dudley A. Buck, North Wilmington, Mass., assignor to Research Corporation, New York, N. Y., a corporation of New York Application July 27, 1955, Serial No. 524,741

33 Claims. (Cl. 307—88)

The subject invention relates to a magnetically controlled gating element and in particular to a superconductive gating element and circuits derived from the use of this element.

It has been known for many years that the resistivity of metals decreases with decreasing temperature. It has also been known that certain conductors, when cooled to very low temperatures approaching absolute zero, lose all apparent resistivity and become superconductive. This effect in pure materials can be made to be a sudden transition and not a gradual decrease in resistance which reaches zero at some finite temperature. It may, in fact, take place over a temperature range of less than .001°, and the exact temperature at which the change takes place is dependent to some extent on the magnetic field around the conductor.

At present time this phonomenon may be observed for most materials at temperatures only obtainable in an environment of liquid helium, although liquid hydrogen temperatures are sufficient to produce superconductivity in niobium nitride, niobium stannate, and a few other materials. In addition, liquid helium at very low temperatures will flow intimately around all parts of any apparatus placed in a helium enviroment and will maintain all parts at a uniform temperature thereby preventing hot spots from developing.

Unfortunately while the phenomenon has been well known, as has the dependence of the transition point on the magnetic field associated with the conductor, relatively little practical use has been made of these properties despite the fact that a great deal of research has been carried out in this field.

It is the object of this invention to utilize the phenomena of superconductivity in a novel and simple electrical gating element wherein current flow is controlled by creating and destroying the conditions necessary for superconductivity.

It is a further object of this invention to provide apparatus for controlling the resistance of a conductive element wherein the control means itself is superconductive.

It is also the object of this invention to provide a novel bistable circuit employing two interconnected gating elements.

It is also the object of this invention to provide a coincident current gating element which may, if desired, be utilized in conjunction with the bistable circuit to provide a coincident current memory circuit.

It is a feature of this invention that it operates at very low impedance and power levels and provides power gain since a relatively small amount of energy will control a large amount of energy. It also provides current gain since a relatively small current will control a large current.

It is a further feature of this invention that the elements may be interconnected to provide logical circuits forming complete computing devices and that it permits complete D. C. isolation between input and output.

An additional feature of the device is that it may be operated so as to utilize the phenomena of superfluidity of the low temperature liquid bath to maintain constant temperature in all the operating elements of the circuit. An understanding of this invention will be facilitated by reference to the drawings in which:

Figure 1:
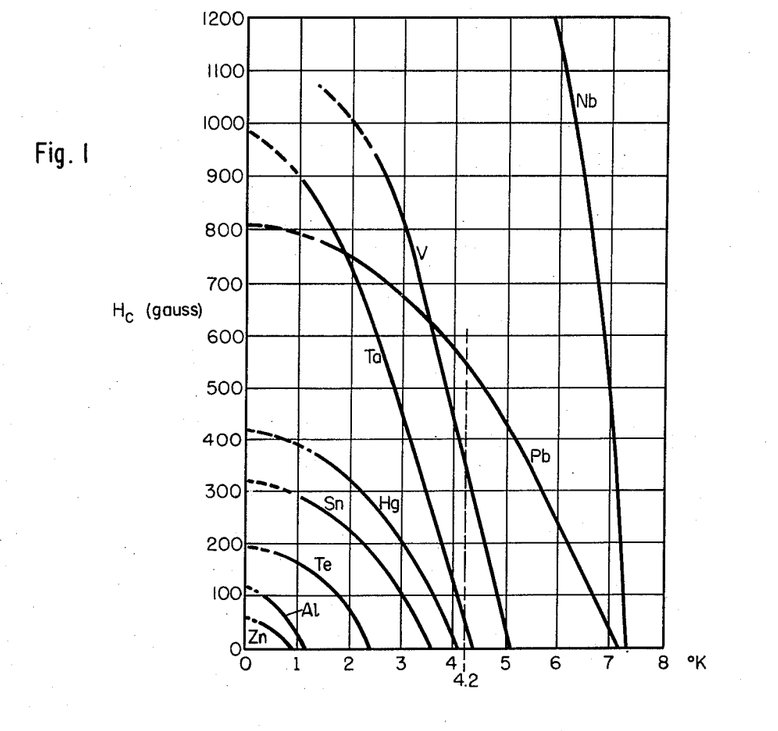
Fig. 1 is a plot of the transition conditions between non-resistive and resistive conductivity for a number of materials.

In Fig. 1 there are illustrated plots of the transition conditions between normal resistive conduction and superconductivity for certain selected materials. In this chart the critical transition temperature in degrees Kelvin is plotted along the abscissa and the flux necessary to destroy superconductivity is plotted along the ordinate. For each element, those points which lie between the transition curve for that element and the origin represent superconductive conditions, and those points to the right or above the curve represent normally resistive conduction.

The temperature of liquid helium under atmospheric pressure is approximately 4.21° K. shown as the dotted line in Fig. 1. It will be seen that above this temperature, tantalum, lead, vanadium, niobium and niobium compounds have their transition temperatures in the absence of a magnetic field. Thus with zero magnetic field and atmospheric pressure all of these materials are superconductive in a liquid helium bath. If the temperature of the bath is reduced by partially evacuating the containing vessel, mercury, tin, tellurium and aluminum will become superconductive. However, none of these materials are superconductive in a bath of liquid helium under atmospheric pressure.

The property of zero viscosity is not observed until the temperature of the liquid helium is reduced below 2.2° K., but suitable vacuum equipment will permit the maintainence of temperatures as low as 1.2° K. However, as a practical matter, the temperature of liquid helium may not be increased by any pressure above approximately 5.2° K. It is therefore possible to vary the temperature of a helium bath within approximately 1 degree above its temperature at atmospheric pressure and about 3 degrees below that temperature.

Tantalum is one of the materials which is superconductive in a helium bath at atmospheric pressure. It provides an especially useful superconductor for use in the subject invention. When a magnetic field is created around the tantalum conductor at 4.2° C. and then the field is gradually increased, the temperature at which tantalum becomes superconductive decreases, and at approximately 50 gauss in liquid helium at 4.2° K. the transition to ordinary resistive conductivity takes place. In other words, the field will bias or cut-off superconduction.

Figure 2:
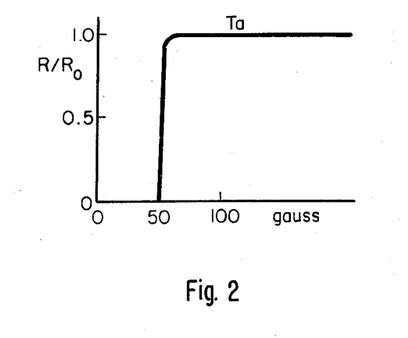
Fig. 2 is a plot of resistance versus field for a specific material (tantalum) at the temperature of helium at atmospheric pressure.

The resistive character of a material such as tantalum may be better understood by reference to Fig. 2 in which this resistance is plotted against field at liquid helium temperature under atmospheric pressure. As the field increases there is an abrupt transition from a zero resistance to ordinary resistive conduction. With pure tantalum and many other pure materials there is substantially no change in resistivity with change in the field after the abrupt transition to resistive conduction takes place. It should also be noted that the current utilized to measure resistance is here and in Fig. 1 assumed to be too small to influence the transition point. With larger measuring currents, the transition point shifts slightly to the left in Fig. 2 because of the magnetic field caused by that measuring current.

Figure 3:
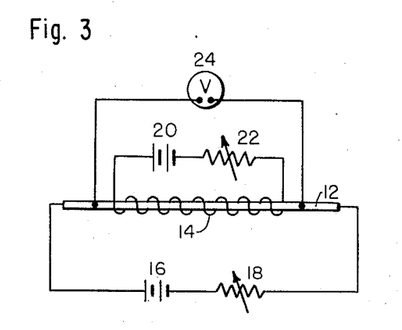
Fig. 3 illustrates the basic gating and control circuit of this invention.

Fig. 3 shows a gating element according to the invention, comprising a tantalum conductor 12 surrounded by a single control winding 14 having a current source consisting of a battery 20 and a variable resistor 22 which is capable of providing a control current sufficient to create a field of more than approximately 50 gauss in the vicinity of the conductor 12. If the conductive element 12 is composed of tantalum wire and the entire unit is immersed in a bath of helium (see Fig. 4) at atmospheric pressure, current may be passed through the tantalum wire 12 from the source consisting of battery 16 and resistor 18 without generating detectable voltage in the micro-voltmeter 24. If, however, a current is simultaneously passed through the control winding from the battery 20 sufficient to create a field of more than 50 gauss the tantalum wire will not be superconductive and a voltage may be measured in the conventional manner with the micro-voltmeter.

Figure 4:
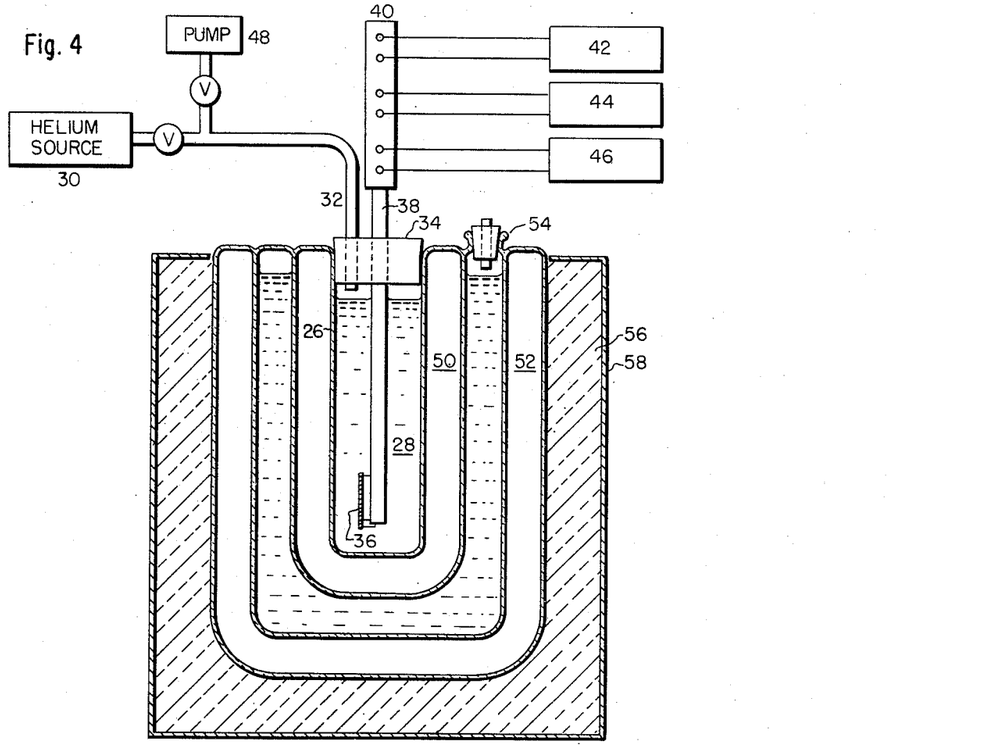
Fig. 4 shows the apparatus associated with the operation of the invention.

Fig. 4 illustrates the environment and associated apparatus utilized to make operative the gate schematically shown in Fig. 3. The sealed insulating flask 26 contains liquid helium 28 and a source of liquid helium 30 will replenish the supply when necessary through the conduit 32 passing through the plug 34 in the mouth of the flask. The superconductive gating element 36 or other circuit is mounted at the end of a long, hollow probe 38 which passes through the plug. The leads to the circuit, which are of course resistive, pass through the probe and out the upper end to a connection board 40 where they are appropriately connected. In the circuit of Fig. 4 the leads are connected to a conductor current source 42, a biasing or control current source 44 and a voltmeter 46. The temperature of the liquid helium is governed by the pressure in the flask. The temperature can be lowered by the use of the vacuum pump 48 if desired. The liquid helium container is of a conventional type in which the helium is insulated by two vacuum chambers 50 and 52 disposed on either side of a chamber 54 containing liquid nitrogen. Packing material 56 holds the flask within the outer case 58.

When the control winding is constructed from a conventional material such as copper the element described in Fig. 3 will have a disadvantage, however. The control winding under these circumstances will be itself resistive and the biasing current necessary to destroy superconductivity in the tantalum wire generates heat in the control winding. The evaporation rate of liquid helium from the low-temperature bath might be excessive for large numbers of such gate elements all operating in a common bath, and heating of the control winding will make temperature control of the tantalum difficult.

Furthermore a gate of the above described type while it could be effectively generated from an external power source would not lend itself to use in computer circuits which are interconnected in the helium bath.

Such a concept requires an additional fundamental element or condition, namely, the use of a superconductive material for the control winding which will remain superconductive through all the conditions of operation of the gate. Where tantalum is used as the conductor, niobium or lead, for example, can be utilized as the control winding material. Because it is strong, and because it is not at all influenced by the presence of fields below about 2000 gauss, niobium is the presently preferred control winding material. For operation at a temperature of approximately 4.2° K., therefore, the element of Fig. 3 is therefore preferably constructed of a very fine tantalum conductor of the order of 1 or 2 centimeters in length surrounded by a single tight coil of insulated niobium wire which is also very fine.

The use of relatively fine wire and a single layer of the control wire is dictated by the fact that one of the objects of this invention is to make possible a new type of computing device, and an essential characteristic of elements used in computing is speed. When a gate of the type shown in Fig. 3 is a passive element which is externally energized, size is a somewhat less critical determinant of speed, but where these gates are utilized as active elements in which the output of one gate may be utilized to bias conduction in another gate, the size of both the control coil and the center conductor becomes of critical importance, and every effort is made to minimize the diameter of both wires in order to maximize the resistance of the conductor and minimize the inductance of the control coil. The problem of switching speed can be more easily analyzed after a consideration of superconductive circuitry.

A typical element of the type disclosed in Fig. 3 consists of a one-inch length of .01" tantalum wire around which is wound a tight coil of .003" niobium wire insulated with a coating bearing the trade name "Formvar" and applied in a tight coil of 250 turns to the inch. In the above construction a current of 300 milliamperes in the noibium control winding will be sufficient to change the resistance of the tantalum from zero to .007 ohm per inch utilizing a 1 in. length of conductor and its associated control winding. This value is for a current of 50 milliamperes in the tantalum wire itself. If the controlled current in the tantalum wire is increased the necessary cut-off current in the niobium control winding is decreased. Thus at 500 milliamperes in the tantalum conductor a current of 275 milliamperes in the niobium control winding will be sufficient to destroy superconductivity. The current carried by the conductor also has an effect on the abrupt nature of the transition because of the larger heating effect produced by a large current. When the field strength from the coil begins to destroy superconductivity and resistance, R, reappears, the $I^2R$ heating effect in the conductor apparently acts rapidly to raise the temperature of the conductor slightly, thus sharpening the transition. This effect is a function of the square of the current in the conductor.

For purposes of strength and ease of manipulation, the lower size limit at the present of both wires corresponds roughly to the size of a human hair (i. e. .01 in. to .001 in.). Using the configuration of Fig. 3, a one inch long gating element of tantalum and niobium may be forced by an external current source to switch in less than 3 microseconds as a passive element. Utilizing a current source of approximately 100 milliamperes through the conductive wire, the voltage across the conductor will be either zero or about .7 millivolt depending on whether the control current is off or on. Where a gate of this type is driven not directly by a relatively high impedance source but by another gate representing a relatively low impedance supply, and where it is necessary that the device provide a power gain the switching time will be somewhat longer than the above figure.

Although the preferred embodiment for use at atmospheric pressure is a tantalum conductor with a niobium control winding, it is possible to use any pair of materials in which the control winding is maintained superconductive while the conductor is turned off and on. However to obtain the advantages of zero viscosity to improve thermal contact with the bath it is necessary to use a sealed system and reduce the pressure above the liquid helium to below 25 mm. of mercury, corresponding to a temperature below 2.2° K. It will be necessary to seal the liquid helium bath in any event in order to recover helium which is lost by evaporation, and so the production of a vacuum requires less added expense than at first might seem necessary. If temperatures in this range are utilized, for example with an aluminum conductor, all portions of the wire and coil within the bath will be coated with a thin film of liquid helium and any heat produced, for example, in welded connections between two wires, will be immediately carried away. In general the pressure above the bath will be controlled to set the bath temperature at a suitable level for the chosen conductor material in order that a relatively small field will be sufficient to destroy superconductivity.

Because of the low impedance of these gating elements, even when they are in their "resistive" state, a low-impedance power supply would be needed to make use of these gates in computing apparatus in which the signals are essentially of a voltage character. Most high speed computing elements of conventional design utilize low impedance power supplies, and connect the various elements in parallel to the common power supply. In order to utilize many superconductive gates in a computer, all using the same power supply, they are preferably connected in series, and the power supply then has a high impedance. Actually, a few ohms is a high impedance relative to superconductive gates of the type described. It will facilitate an understanding of this invention to consider these elements as current elements, switching a given current among two or more alternate paths. Since they have power gain and current gain, it is not necessary to employ external transformation of the signals.

A bistable circuit of this character is illustrated by reference to Fig. 5. As in all superconductive circuiting this circuit is assumed to be surrounded by a cooling bath and to be operated as described by reference to Fig. 4. A number of circuit elements may be mounted at the end of a hollow probe such as that designated in Fig. 4. In the bistable circuit of Fig. 5 the single current carrying lead (e. g. niobium) 60 supplies current from an external battery 62 and variable impedance 64 to either of two bias or control coils (e. g. niobium) 66 or 68. These control windings are connected in series at the junctions 70 with the conductors 72 and 74 which may be of tantalum. Thus two paths are defined which the current may follow. It may pass through coil 66 and hence the conductor 72 which is inserted in the field of coil 68 or alternatively the current may pass through coil 68 and hence through the conductor 74 which is inserted in the field of coil 66. However, once a current is established in either of these paths it automatically biases against transmission in the other path. Thus if a current is established in coil 66 which is sufficient to destroy the superconductivity of the conductor 74, substantially no current will pass through coil 68 since this path is, comparatively speaking, infinitely resistive. Rather, all of the current will pass through coil 66 and hence through the conductor 72 which is not biased by a magnetic field. Thus, interconnecting two of the gating elements of Fig. 3 so that a current passing through one gate will block transmission through the other it is possible to construct a bistable circuit which permits transmission through only one of two possible paths at a time. Such a circuit is a memory device in the conventional computer sense.

Figure 5:
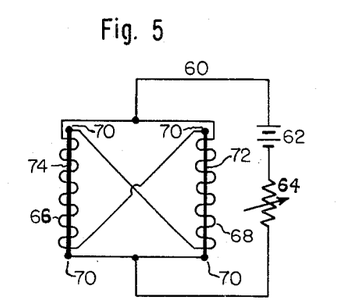
Fig. 5 illustrates a bistable circuit constructed in accordance with this invention.

In the description of the circuit of Fig. 5, it is assumed that a current is established in one path or the other.

Figure 6:
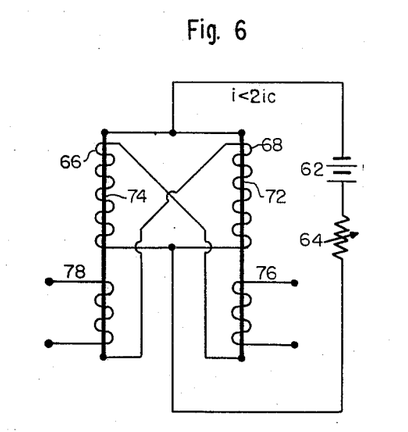
Fig. 6 illustrates the bistable circuit of Fig. 5 together with operating leads to set the circuit.

A means for setting and clearing the bistable element of Fig. 5 is illustrated in Fig. 6, like portions being designated by the same reference characters as in Fig. 5. A current supplied by battery 62 and controlled by resistor 64 will flow through the connecting lead 60 and then in either conductor 72 or conductor 74 of the bistable element which may be of tantalum if the associated bath is helium at atmospheric pressure. Conductor 72 is connected in series with the bias or control winding 66 around conductor 74 and similarly conductor 74 is connected in series with the control winding 68 around conductor 72 thereby forming a bistable element of the type illustrated in Fig. 5. In addition, a set winding 76 is provided for conductor 72 and a set winding 78 is provided for conductor 74. Each set winding is provided with a current source (not shown). Assuming that a current is passing through conductor 74 and winding 68, thereby destroying superconductivity of conductor 72 it will be seen that the circuit is stable, and some means must be provided for changing the conduction through conductor 74 and provide conduction through conductor 72 at will. If a current from a D. C. source (not shown) is passed through winding 78 this winding will act to destroy superconductivity in the element 74 so that the tantalum conductor in both paths will be resistive and the current flowing in conductor 60 will tend to divide evenly. If this current is large the effect will be to place both of these conductors in the resistive state since the current in tantalum wire 72 will destroy superconductivity in conductor 74 and vice versa. Under these conditions if the current in coil 78 is removed both sides would probably remain resistive when stability returned and conduction would continue through both sides.

One way of assuring that the device will change its conductive state is by providing that the set coil 78 shall be relatively long, thereby increasing the resistance in a considerable length of the conducting wire and tending to force most of the current into the alternate path. However, the preferred embodiment of this circuit contemplates the use of a current in lead 60 which is substantially less than twice the current necessary in winding 66 or in winding 68 to destroy superconductivity. To illustrate the method of operation let it be assumed that a current of 300 milliamperes is required in coil 68 in order to destroy superconductivity in conductor 72. Assume also that the current available in lead 60 is a maximum of 500 milliamperes. Under these circumstances if a biasing or setting current is applied to winding 76 sufficient to destroy superconductivity in conductor 72, and the current in lead 60 divides equally between the two branches, that current will be insufficient by itself to destroy superconductivity in the other conductor. Thus under these circumstance if 500 milliamperes is being propagated through lead 60 the coils 66 and 68 will each carry only 250 milliamperes and this is less than the amount needed to destroy superconductivity. Since the biasing or setting current applied to winding 76 is above the threshold level for that coil it reduces the current in conductor 72 and coil 66 to the point where conductor 74 is superconductive. All of the current in lead 60 will therefore flow through the other path of the bistable element. When the current is removed from winding 76 conduction will remain in this other path. By the same means a current applied to bias winding 78 will destroy superconductivity in conductor 74 and re-establish it in conductor 72. It will be apparent that for this type of operation the current in line 60 must be not greater than twice the current necessary to destroy superconductivity in either side of the symmetrical flip-flop.

Figure 7:
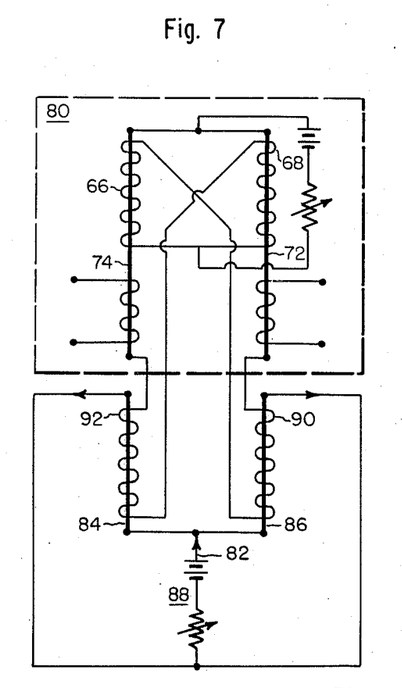
Fig. 7 illustrates the bistable circuit of Figs. 5 and 6 together with sensing means forming a single memory element.

While the above described device in Fig. 6 provides a bistable element which may be set in either of its stable states it is necessary also that an effective means of sensing the state of the bistable circuit be provided. The use of voltage detecting means to determine resistive drop along the conducting tantalum wire is obviously unsatisfactory since the tantalum is superconducting and therefore when the bistable circuit has come to rest in one of its stable states, there is no voltage drop across it (and therefore no power dissipation). A simple detecting apparatus may, however, be provided by two additional gating elements arranged as shown in Fig. 7. A bistable element as described by reference to Fig. 6 together with means for setting and clearing that element is contained within the dotted lines and is designated 80.

In addition a separate sensing wire 82 is provided which branches into two sensing leads 84 and 86. A current source 88 supplies current to these sensing leads. Conductor 72 connects to a superconductive coil 90 around sensing conductor 86 and in a similar fashion conductor 74 is connected in series with a superconductive coil 92 which is capable of biasing sense conductor 84. Since the flip-flop 80 may be set so that either conductor 72 or 74 is conductive but both are not conductive at the same time, it is possible for only one of the two sense leads 84 and 86 to be superconductive at a given time. If lead 72 of the flip-flop is conducting current that current will pass through the coil 90 and will destroy superconductivity of lead 86. However, at that time lead 74 will carry no current and since lead 84 will be superconductive all of the gate sensing current will pass through this lead. In this same way current in lead 74 will result in superconductivity in sensing lead 86. As in the case of the flip-flop itself the biasing windings 90 and 92 are constructed of niobium or some other material which will be superconductive throughout the operation of this circuit and the conductors 84 and 86 will be of a material which is near the transition point at the temperature of operation. In general the state of the flip-flop could be determined by detecting the resistive conductors in Figs. 5, 6 and 7. The purpose of the output gates described in Fig. 7 is to permit the output to be in a form (i. e. current) which can be used to control other elements in a superconductive computer.

Figure 12:
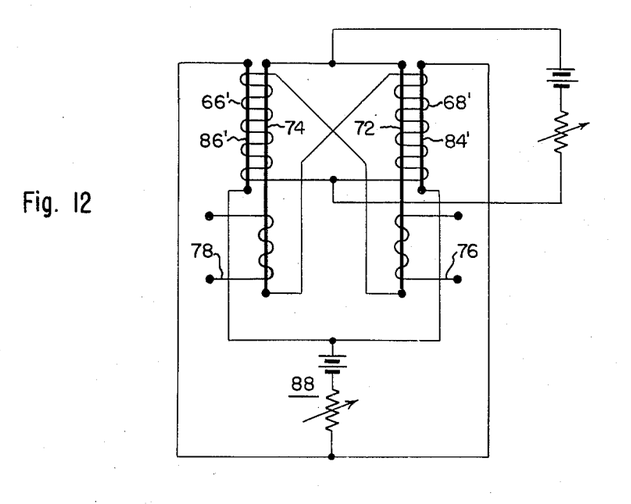
Figs. 12 and 13 show other circuits embodying the features of the invention.

While the various coils have been shown as separated in the drawings for ease of explanation, it is apparent that coil 92 is in reality an extension of coil 68, and coil 90 is an extension of control coil 66. Therefore an equivalent but more compact construction, as shown in Fig. 12 is to run the sensing conductors 84' and 86' directly through the control coils 68' and 66' respectively of the bistable circuit 80, the other connections being exactly as in Fig. 7. The disadvantage of this simplified construction is that is increases the diameter and therefore the inductance of the control coil, and introduces an increased air gap resulting from the packing together of two round wires.

Figures 8, 10:
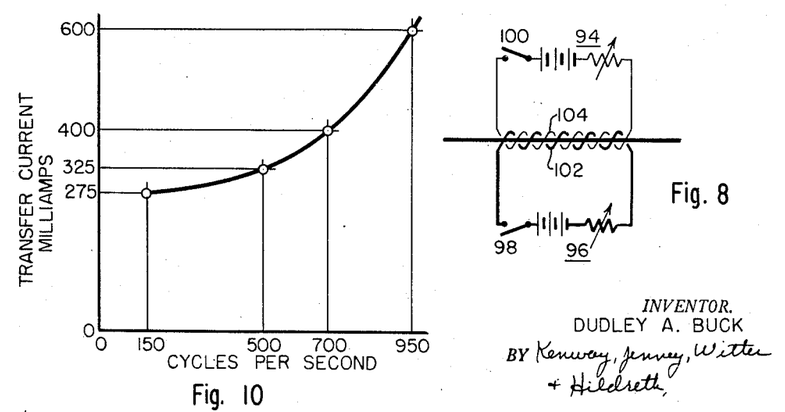
Fig. 8 illustrates a coincident current gating element controlled by two superimposed fields.
Fig. 10 illustrates a clock showing the variation in frequency with transfer current for the clock of Fig. 9.

It therefore is possible to bias conduction through a superconductor by any one of a series of control windings around that conductor. In addition, since the transition is an abrupt one which will not take place until the magnetic field exceeds a predetermined level, a plurality of control coils may be utilized to provide a coincident current switching or gating element. Such an element is shown in Fig. 8. Interleaved or overlapped coaxial control windings around the conductor are connected to current sources 94 and 96 and the switches 98 and 100 are in series with the two coils 102 and 104 respectively. The current level and number of turns in each winding may be chosen to provide that with either switch alone closed the magnetic field associated with the energized coil will be below the level necessary to destroy superconductivity in the conductor. However, the two fields together may be large enough to destroy superconductivity, so that closing of the gate may be achieved only by closing both switches 98 and 100 but not either one alone. Since the fields may be made additionally effective to operate the gate, one field may be created which will continually destroy superconductivity, and the gate may be opened by the superposition over this field of an opposing field which will reduce the net residual magnetic field below the threshold level. While one of the two fields may be applied to an entire group of conductors by a single large coil, this form of construction is believed to be more difficult to construct and operate than the use of small superimposed or interleaved coils.

One of the principal applications for a coincident current element is in the creation of a so-called coincident current memory. Memories of this type permit simplified selectors between a plurality of storage units by the use of coordinate selection whereby each storage element is represented and controlled by the intersection of a unique combination of coordinate leads. Such a memory unit may be formed utilizing the bistable circuit of Fig. 7, since any bistable circuit is inherently a memory element. It is necessary simply to replace the single set or control winding on each side of the circuit with a coincident current gate as described by reference to Fig. 8 so that the coincidence of two currents is necessary to set the bistable circuit to store a one, and a separate combination of two currents to set the circuit to the state denoting storage of a zero.

A consideration of the use of the circuits of Figs. 5 through 8 requires a consideration of the switching speed or frequency response and power losses possible in making a transition from one state to another. Referring particularly to the bistable circuit it is apparent that the time required to energize either control coil when conduction through the other coil is cut off is a function of the inductance of the coil and is inversely proportional to the resistance of the center conductor, both sides of the circuit being identical. This $L/R$ time constant is fundamental. Since the inductance of the control coil wire increases as the square of the diameter of that wire and the resistance of the center wire decreases as the square of the diameter, decreasing the wire diameter increases speed in proportion to the fourth power of the wire size, assuming the pitch of the control winding remains constant.

Losses in power are due to eddy currents which tend to slow the switching period, to certain inherent relaxation-like losses apparently relating to the phase boundary between normal and superconductive regions, and to heating losses which as mentioned, tend to speed the transition but may absorb power in doing so.

Assuming that the $L/R$ time constant is predominant in controlling speed it will be seen that the larger the steady state current, the faster the current will build up to the threshold level necessary to bias conduction in the conductor controlled by the coil being energized. In other words, the $L/R$ figure gives the time for conduction to reach steady state conditions, but the critical factor is not establishing a given steady state current but establishing a current sufficient to destroy super-conductivity. The larger the applied current, the quicker this threshold level will be reached. This fact in turn means that for example, a group of bistable circuits of the type shown in Fig. 7 may be connected in cascade as will be shown by reference to Fig. 9 and the speed with which the transfer current from one will drive the next will be a function of the current magnitude.

Figure 9:
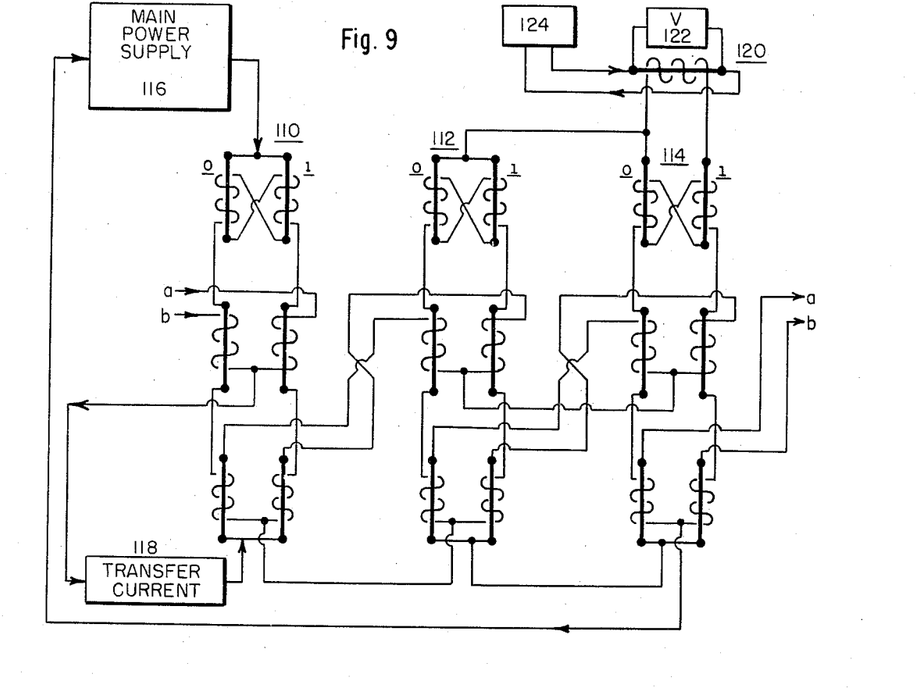
Fig. 9 illustrates a free-running multi-vibrator or clock having a controllable frequency composed of three flip-flops in series.

A free-running multi-vibrator or clock of this type composed of three flip-flops connected in cascade is illustrated in Fig. 9. The three flip-flops, 110, 112, and 114, are connected in series so that the transfer current from each flip-flop circuit sets one side or the other of the succeeding circuit. The output or transfer current of the final flip-flop 114 is utilized to control the set windings of the first flip-flop 110 and is connected so as to switch this flip-flop. The controllable current source 116 supplies all three bistable circuits. A separate transfer current source 118 is utilized to provide a variable transfer current in order to control the frequency with which each bistable circuit will set the next. Assuming that the left side of each flip-flop is designated the "one" side in binary notation, the circuit in Fig. 9 is such that when flip-flop 110 is set in its zero state current through its read-out or transfer gate will set flip-flop 112 to zero and this in turn will set flip-flop 114 to zero. The output from flip-flop 114 is, however, utilized to reverse the state of flip-flop 110 to set it in its "one" conducting state. When this is done the subsequent flip-flops 112 and 114 will again reverse after which flip-flop 110 will be reset to its zero state.

In the first experimental circuit of this type a complete cycle in which each side of each bistable circuit is reversed once required about .001 of a second using 450 ma. in both power supplies. Thus the reversal time required for the transfer output of one stage to set the input winding of the next stage was about 167 microseconds. This clock utilized tantalum conductors having diameter of .009 inch and a niobium control winding of .003 inch.

The state of the final flip-flop 114 and the frequency with which it reverses is most readily determined by the use of an additional gate 120 which is connected in series in the one side of flip-flop 114. Thus when current is passing through the tantalum wire constituting the "one" side of the flip-flop 114 it will also pass through the biasing control winding of gate 120 and will cause the tantalum wire in gate 120 to be resistive. A voltage can then be measured by the voltmeter 122 as shown. The current source 124 is always on but when the current in flip-flop 114 is passing through the control winding on the "one" side of that circuit and through the tantalum wire on the zero side, there will be no current through the control winding of gate 120. Since the tantalum wire in this gate will then be superconductive no voltage will be measurable by the voltmeter 122.

Fig. 10 illustrates the change in frequency of this clock circuit with variation in transfer current. It will be seen that a variation between 275 and 600 ma. changes the frequency of the unit in cycles per second from 150 to 950 C. P. S. This variation is due to the above described fact that while the $L/R$ time constant required for the current to reach its maximum level is unvarying, the larger transfer current permits the level to reach the biasing value more quickly.

The term cycles per second means complete cycles in which each bistable circuit in Fig. 9 assumed both stable states. The time required to control the flip-flop is not necessarily the same as that required to set the read out gate to control the transfer current. Nevertheless an order of magnitude approximation of the response time for a single gate may be obtained by inverting the cycles per second figure to obtain seconds per cycle and dividing this figure by twelve.

Figure 13:
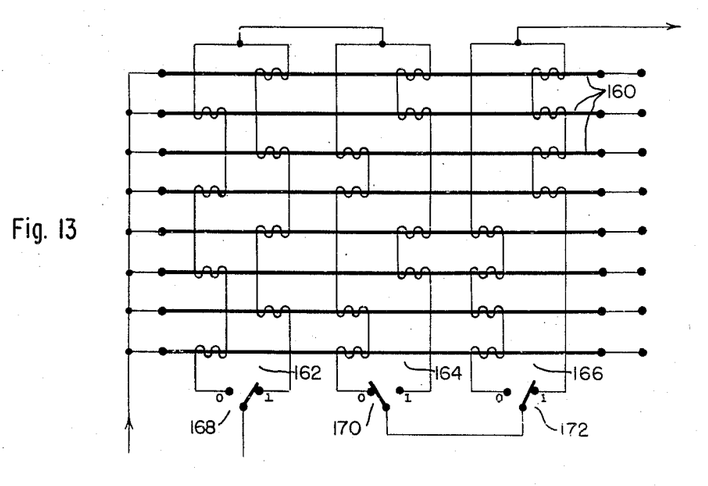

It will be apparent that the flip-flop shown in Fig. 9 could have been connected in other ways and for example that both the transfer current and the main power supply could have been a single source of current. In addition many other forms of computer circuitry may be constructed using the basic elements described above. For example the circuits described in co-pending application by myself and Kenneth H. Olsen, Ser. No. 345,766, which are designed principally for alternating current use, may be directly adapted to D. C. applications by employing the basic elements of this invention. In the above mentioned application, a plurality of saturable conductors are selectively biased by the use of a matrix of control windings to provide one and only one unsaturated element. By the same arrangement of the gates described in this invention one and only one superconductive path may be defined, as shown in Fig. 13, which illustrates an eight-position switch having eight conductors 160, preferably of tantalum, and three sets of control coils 162, 164 and 166. The control coils are arranged in the manner now familiar for selecting switches; thus the coils 162 are arranged in two groups of four wound on odd and even conductors, the coils 164 are wound on odd and even pairs, and the coils 166 are wound on groups of four conductors. By appropriate settings of the switches 168, 170 and 172, any selected seven of the eight conductors 150 are made resistive, and therefore a single selected conductor remains superconductive.

Figure 11:
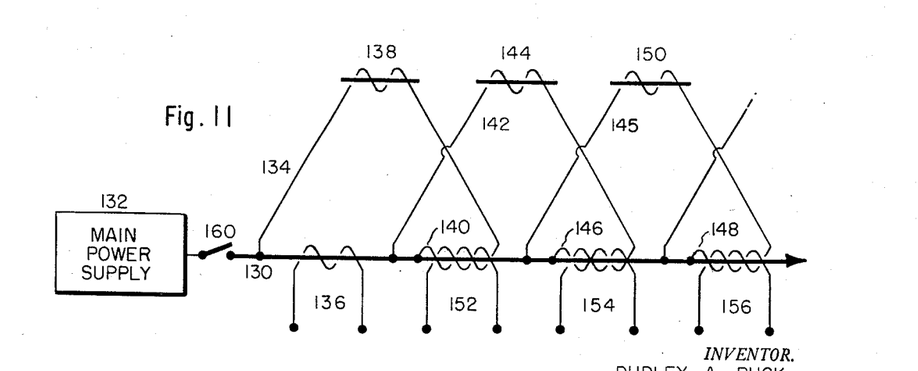
Fig. 11 shows one possible circuit for a carry propagation circuit applicable to a digital adder utilizing coincident fields.

Another type of circuitry is illustrated in Fig. 11 in order to describe one of many ways in which the coincident current features of this invention may be utilized. The tantalum conductor 130 carries a series of control windings. These control windings make it possible to create a resistive portion of the tantalum wire inside each winding and the connections permit this resistive portion to be moved from one position to the next along the conductor or to selectively maintain the resistive portion at any desired position. For example, if it is assumed that current from the main power supply 132 is turned on it will propagate through the superconductive conductor 130 since any other path requires that current be built up in an inductance. The current may be forced to pass through conductor 134 by means of a biasing input pulse of current on set winding 136. Such a current in conductor 134 will bias gate 138 and will pass through the coil 140 around conductor 130. The section of the conductor 130 carried within coil 140 will thereupon be made resistive and the current in conductor 130 will be forced into conductor 142 to set the gate 144 and will thus be propagated. The resistive spot moves along the tantalum wire to positions inside of coil 146 and shortly thereafter coil 148. The position of the resistive spot is indicated by the condition of the output gates 138, 144 and 150. Thus a pulse of current on the biasing coil 136 (which would, of course, be superconductive niobium or some similar material) will regardless of its polarity result in the creation of a resistive segment of wire under coils 146 and 148 successively in the absence of an additional input.

However, this carry procedure may be stopped by the use of a half amplitude current pulse on any one of the input coils 152, 154, or 156. Each of these coils is wound around or interleaved with the coils 140, 146, and 148 respectively. If the half amplitude pulse opposes the field created by these coils 140, 146 and 148 the net field surrounding the tantalum will be below the level necessary to make the tantalum resistive. As a result, instead of flowing through conductor 142, for example, to set gate 144 and coil 146, current would flow directly through the superconductive tantalum 130 and the transfer of the resistive segment will be blocked. However, any one of the segments may be resistive and the carry procedure started again at any point by the input of a full biasing current pulse on any of the input set windings 152, 154, 156, as well as the original set winding 136. The current may be most easily re-established in the center conductor 130 by opening and then closing switch 160 to temporarily cut off the main power supply. This overcomes the tendency of the current to stay established in an inductive coil such as 138 and 140. An alternative method would be to insert a small resistance in lines 134, 142 and 145 so that the only superconductive path will be conductor 130.

It will be understood that the above described clock and carry circuits are intended only to be illustrative of the type of circuitry which is made possible by the subject invention. A computer of any desired size or type may be constructed from the basic elements described herein. A computer consists essentially of flip-flop and gate circuits together with switch and memory circuits all of which have been sufficiently described herein to enable one skilled in the art to construct a computer therefrom. While this invention has been described with respect to a limited number of embodiments, it is therefore apparent that it may be applied in many ways and this invention is limited not to the above disclosure but only by the following claims.

I claim:

1. An electrical gating element comprising a conductor having critical temperature and magnetic field transition conditions between resistive and superconductor states, means for maintaining said conductor at a temperature such that the resistivity of the element is substantially zero, and means for applying a magnetic field to said conductor to rapidly destroy the superconduction state thereby creating a relatively high resistance to the flow of current, said field-applying means comprising a second conductor which is superconductive at the operating temperature in the presence of its own field.

2. An electrical gating element comprising a conductor formed of material having critical temperature and magnetic field transition conditions between resistive and superconductive states, a control coil for creating a magnetic field in the vicinity of the conductor said coil being of a material that is superconductive over a range of conditions in which the conductor is both superconductive and resistive, a low temperature medium for the element to maintain the conductor in a superconductive state in the absence of the control coil field, the temperature of said medium being near the critical temperature for the conductor, and means for applying current to the control coil to create a magnetic field sufficient to destroy superconductivity in the conductor.

3. An electrical gating element comprising a conductor formed of material having critical superconductivity transition conditions, a control coil around the conductor having a higher magnetic field transition point than the conductor, means for establishing a low temperature below the critical temperature for the conductor, and means for applying current to the coil to create a magnetic field sufficient to destroy superconductivity in the conductor.

4. A bistable circuit comprising two conductors having critical superconductivity transition conditions, a control coil surrounding each conductor, means connecting each conductor in series with the control coil around the other conductor, means for maintaining the temperature below the critical temperature for the conductors, and means for selectively establishing current flow in either conductor whereby said current will create a magnetic field around the other conductor sufficient to destroy superconductivity in said other conductor.

5. A bistable circuit as described in claim 4 having in addition means for detecting the conductor having no resistance.

6. A bistable circuit as described in claim 5 having in addition a separate sensing conductor through each control coil which responds to current flow in the coil by itself changing in resistivity.

7. A bistable circuit as described in claim 4 wherein the control coil and connecting wires are formed of conductive material having higher critical temperature and field transitions than the conductor whereby the coil material is maintained in its superconducting state.

8. A bistable circuit comprising two conductors having critical superconductivity transition conditions, means for separately applying a magnetic field to each conductor, means for energizing the magnetic field applied to each conductor by utilizing the current passing through the other conductor, means for maintaining the conductors near the critical transition region between resistive and non-resistive conductivity, and means for selectively establishing current flow in one conductor or the other whereby said current activates a magnetic field sufficient to destroy superconductivity in the other conductor.

9. A bistable circuit as described in claim 8 wherein the magnetic fields are created by coils of superconductive wire.

10. A bistable circuit comprising two conductors having critical transition conditions, a control coil surrounding each conductor, means connecting each conductor in series with the control coil around the other conductor, a sensing means for each current path responsive to current in said path, a current source for the bistable circuit, means for limiting the current flow to less than twice the critical level necessary to bias the individual conductors, means for maintaining the temperature of the circuit elements below the critical temperature for the conductors, a setting coil about each conductor and means for applying a biasing current to the setting coil.

11. A bistable circuit as in claim 10 wherein the sensing means is a sensing conductor having critical superconductivity transition conditions surrounded by a coil in series with each conductor of the bistable circuit whereby current in said conductors destroys superconductivity in the sensing conductor.

12. A bistable circuit as in claim 10 wherein the sensing means comprises a current source, two sensing conductors in parallel with the source having critical superconductivity transition conditions and a biasing coil around each sensing conductor, one coil being in series with each conductor of the bistable circuit whereby current in said bistable conductors destroys superconductivity in the sensing conductor.

13. A coincident-current electrical gating element comprising a conductor having critical temperature and magnetic field transition conditions between resistive and superconductive states, a plurality of superimposed control coils about said conductor, a low temperature bath for the conductor and control coils, means for maintaining the bath below the critical temperature, and means for simultaneously applying a plurality of coincidental currents to the control coils to create a magnetic field sufficient to destroy superconductivity in the conductor.

14. A coincident-current gating element as described in claim 13 wherein the control coils have higher temperature and magnetic field transition conditions than the conductor.

15. A coincident-current memory element comprising a bistable circuit having two conductors of material having critical superconductivity transition conditions, a superconducting control coil around each conductor, means connecting each control coil in series with the other conductor, means for maintaining the temperature below the critical temperature for the conductors in the absence of a biasing magnetic field, a plurality of superimposed setting coils for each conductor, means for separately energizing each setting coil to selectively provide a net additive magnetic field around either conductor above the level necessary to bias superconductivity in that conductor and establish current flow in the other conductor, and means to detect which conductor is superconductive.

16. An electrical gating element comprising a conductor having critical temperature and magnetic field transition conditions between resistive and superconductive states, a plurality of superimposed control coils about said conductor, a low temperature bath for the conductor, means for maintaining the bath at a temperature sufficiently low to produce superconductivity in the absence of a biasing magnetic field, means for applying a current to at least one of the superimposed control coils sufficient to create a magnetic field capable of destroying superconductivity in the conductor, and means for selectively applying currents to at least one of the other control coils to create a magnetic field opposed to and superimposed on the biasing magnetic field to produce a net residual magnetic field below the level necessary to bias superconductivity.

17. An electrical gating element as in claim 16 wherein the control coils are each of a material which will maintain superconductivity in the presence of the magnetic field applied to the conductor.

18. A computer comprising a low temperature bath, a plurality of conductive elements in said bath said elements having a critical magnetic field temperature transition region between superconductive and resistive conduction, means for maintaining the temperature below the transition temperature for the conductor in the environmental field permeating the bath, at least one superconductive bias coil around each conducting element said bias coil being formed of a material which will maintain its superconductive state in the presence of its own field, means for connecting selected control coils in series with selected conductors to provide a plurality of interdependent superconductive paths each of which is logically related to the other paths, current-supply means for each series of elements and bias windings, and detecting means to determine the state of each path.

19. An electrical gating element comprising two conductors arranged side-by-side, the conductors having critical temperature and magnetic field transition characteristics between resistive and superconductive states, means for maintaining said conductors at a temperature such that they are superconductive in the absence of a magnetic field, and a control coil surrounding and wound around both of the conductors to establish a magnetic field to destroy superconductivity in both conductors.

20. A gating element as defined in claim 19 in which the control coil is itself of superconducting material.

21. A bistable circuit comprising two transfer conductors and two sensing conductors, all of a material having critical temperature and magnetic field characteristics between superconductive and resistive states, a control coil surrounding one of the transfer conductors and one of the sensing conductors, a second control coil surrounding the other transfer and sensing conductors, means for connecting each transfer conductor with the control coil surrounding the other transfer conductor, and means for selectively establishing current flow in one of the transfer conductors whereby said current will establish a magnetic field to destroy superconductivity in the other transfer conductor and its associated sensing conductor.

22. A bistable circuit as defined in claim 21 in which the control coils are of a material to maintain superconductivity in the presence of their own magnetic fields.

23. A matrix switch comprising a plurality of conductors having critical temperature and magnetic field transition characteristics between superconductive and resistive states, a plurality of control windings to establish magnetic fields in the conductors, and means for energizing selected control windings to destroy superconductivity in selected conductors.

24. A switching array comprising a plurality of transition conductors having critical temperature and magnetic field transition characteristics between superconductive and resistive states, magnetic field applying means for the several transition conductors, and means for selectively energizing said field applying means to destroy superconductivity in selected transition conductors.

25. An array according to claim 24 in which the field applying means comprises control conductors in proximity to the transition conductors.

26. An array according to claim 24 in which more than one field applying means are associated with each transition conductor, and in which the energization of any single field applying means is insufficient to destroy superconductivity in a transition conductor, and destruction of superconductivity is caused by coincident energization of more than one field applying means.

27. An array according to claim 26 having means for energizing one of the field applying means in a direction opposite to another of the field applying means.

28. An array according to claim 25 in which more than one control conductor are in proximity to each transition conductor, and in which any single control conductor is insufficiently energized to destroy superconductivity in a transition conductor and means for coincidentally exciting more than one control conductor to cause destruction of superconductivity in a selected transition conductor.

29. An array according to claim 28 having means for energizing one of the control conductors in a direction to establish a magnetic field in a direction opposite to the field of another control conductor in the vicinity of a selected transition conductor.

30. An array according to claim 25 in which each control conductor is of a material which remains superconductive under conditions of transition of a transition conductor to the resistive state.

31. An array according to claim 28 in which each control conductor is of a material which remains superconductive under conditions of transition of a transition conductor to the resistive state.

32. A bistable circuit comprising two transition conductors having critical superconductivity transition conditions, a control conductor in proximity to each transition conductor to establish when energized a magnetic field in the neighborhood of said transition conductor, a connection between each transition conductor and the control conductor associated with the other transition conductor, and means for establishing current flow in either transition conductor whereby said current will cause a magnetic field near the other transition conductor to destroy superconductivity therein.

33. A bistable circuit according to claim 32 in which the control conductors have higher critical temperature and field transitions than the transition conductors.

No references cited.

Notice of Adverse Decision in Interference

In Interference No. 91,653 involving Patent No. 2,832,897, D. A. Buck, Magnetically controlled gating element, final decision adverse to the patentee was rendered Feb. 14, 1963, as to claims 19, 20, 21 and 22.

[*Official Gazette July 23, 1963.*]